United States Patent
DeVolpi

(10) Patent No.: US 6,681,926 B2
(45) Date of Patent: Jan. 27, 2004

(54) INTEGRAL KEYBOARD AND STORAGE ORGANIZER

(76) Inventor: Dean R. DeVolpi, 806 Buchanan Blvd., #115-233, Boulder City, NV (US) 89005

( * ) Notice: Subject to any disclaimer, the term of this patent is extended or adjusted under 35 U.S.C. 154(b) by 0 days.

(21) Appl. No.: 10/053,747

(22) Filed: Jan. 18, 2002

(65) Prior Publication Data

US 2003/0085138 A1 May 8, 2003

Related U.S. Application Data

(60) Provisional application No. 60/336,951, filed on Nov. 7, 2001.

(51) Int. Cl.$^7$ ............................................. B65D 69/00
(52) U.S. Cl. ..................... 206/224; 206/320; 361/680
(58) Field of Search ....................... 206/216, 214, 206/224, 371, 305, 320, 576, 577; 211/11, 126.1, 126.4, 131.1; 248/918; 361/680–683, 727

(56) References Cited

U.S. PATENT DOCUMENTS

| | | | |
|---|---|---|---|
| 5,265,735 A | 11/1993 | Hassel et al. | |
| 5,576,929 A | * 11/1996 | Uchiyama et al. | .......... 206/305 |
| 5,598,921 A | 2/1997 | Hunt | |
| 5,835,344 A | * 11/1998 | Alexander | .................. 206/320 |
| 5,875,912 A | 3/1999 | Hobson | |
| 5,901,934 A | 5/1999 | Wilson | |
| 5,995,025 A | 11/1999 | Sternglass et al. | |
| 6,078,495 A | * 6/2000 | Cipolla et al. | .............. 361/680 |
| 6,135,810 A | 10/2000 | Damson et al. | |
| 6,285,544 B1 | 9/2001 | Chandramohan | |
| 6,312,175 B1 | 11/2001 | Lum | |
| 2001/0021098 A1 | 9/2001 | Kambayashi | |
| 2001/0028548 A1 | 10/2001 | Oura et al. | |

* cited by examiner

*Primary Examiner*—Luan K. Bui
(74) *Attorney, Agent, or Firm*—Quinn & Quinn, P.C.; William J. Quinn; Cornelius P. Quinn

(57) ABSTRACT

The integral keyboard and storage organizer of the present invention provides a keyboard with a housing that can be hingably or slideably opened to access an integral storage organizer cavity. It provides for convenient organized storage of traditional desktop supplies, sundry computer related items and personal items, at no appreciable additional cost to that of a standard keyboard, and without occupying any valuable desktop space in addition to that required by the footprint of the keyboard.

16 Claims, 2 Drawing Sheets

ND STORAGE
INTEGRAL KEYBOARD AND STORAGE ORGANIZER

CROSS REFERENCE TO RELATED APPLICATION

This application claims the benefit of U.S. provisional patent application Ser. No. 60/336,951 filed Nov. 7, 2001 and entitled Keyboard Organizer, which is incorporated herein by reference.

FIELD OF THE INVENTION

The present invention pertains generally to computer keyboards and computer storage and organizer devices.

BACKGROUND OF THE INVENTION

Since the introduction of the personal computer, in addition to the typical desktop supplies such as pencils, pens, sticky notes and paper clips, items associated with the personal computer, such as diskettes, CD ROM disks and CD marking pens, are required to be readily available, and preferably close at hand to the desktop. Storage of such items upon the desktop reduces the amount of desktop space available, which is compounded by the reduction in desktop space occasioned by the placement of the computer keyboard and monitor upon the desktop.

Various desktop organizers, for holding pens, pencils, paper clips, sticky notes, rubber bands and the like have been known prior to the introduction of personal computers, and are used and directed toward the optimization of useable desktop space. Further, since the introduction of the computer, various desktop organizers and storage devices have been devised which are attached to the computer's components and are directed toward organizing supplies and optimizing usable desktop space where a computer is involved. Known desktop organizers and storage devices for use in connection with a personal computer are illustrated through the following patents of the prior art:

U.S. Pat. No. 5,265,735 to Hassel et al. discloses a modular organizer as a separate component, that is attached to the rear surface of a computer keyboard for storage of pens, pencils, computer disks and the like; unfortunately, the Hassel et al. device when attached to a computer keyboard as disclosed increases the overall front to rear width of the keyboard, and may not be suitable for attachment to keyboards of particular sizes or with curved rear surfaces.

U.S. Pat. No. 5,598,921 to Hunt discloses an organizer that is to be attached to a keyboard shelf. Like the device of the patent to Hassel et al., the Hunt device is a separate component that requires space in addition to that of the computer keyboard.

U.S. Pat. No. 5,875,912 to Hobson discloses a separate component organizer that is adjustable so that it may be attached to inclined surfaces.

U.S. Pat. No. 6,285,544 discloses a storage basket as a separate component that is attached to the computer housing for storage of work product and sundry computer related items.

The prior art examples summarized above all indicate the need for organizers which store desktop supplies and sundry computer related items at a location convenient to the computer keyboard; however, these prior art organizers, which provide storage of desktop supplies and sundry computer related items, are separate component accessories that are attached in some fashion to or near the computer keyboard and occupy precious space.

Accordingly, it is an object of the present invention to provide an organizer which can store desktop supplies, sundry computer related items, and personal items, such as keys, convenient to the computer keyboard without necessitating the use of any additional space near the keyboard. It is a further object of the present invention to provide such an organizer at minimal cost.

SUMMARY OF THE INVENTION

The objects of the present invention are attained by a keyboard of the present invention, which may be wired or wireless, having an integral storage organizer.

At the time personal computers were introduced, the keyboards of the personal computers utilized bulky mechanical switches which occupied nearly the entire interior of the keyboard case. Since that time the switching mechanisms utilized within the keyboards have been refined and miniaturized. A typical keyboard produced today utilizes a very thin membrane switch layer, as thin as 0.030 inches thick, upon which rubber dome switches are placed, which are also of low profile, and can be compressed to complete electrical conductivity in the membrane switch. The plastic keys of the keyboard reside upon the dome switches. A backer board is typically placed below the membrane switch to provide rigidity to the membrane switch so that it is not deflected upon actuation of the dome switches through the keys. Although the size of keyboard switching mechanisms have been drastically reduced in thickness, for ergonomic reasons, the dimensions of typical keyboard housings have not; as a result, an appreciable amount of the interior space within the housings of keyboards produced today is empty. The present invention allows this empty space within the housing of computer keyboards to be utilized as an organizer for storage of desktop supplies, sundry computer related items and personal items. Further, the height of the keyboard can be increased without enlarging the footprint of the keyboard and thereby increase the depth and volume of the organizer without occupying any additional desktop space.

In a preferred embodiment of the integral keyboard and storage organizer of the present invention, an upper housing shell and a lower housing shell are provided. The keyboard switching mechanism is disposed within the upper housing shell which is typically comprised of the plastic keys which protrude through the upper housing shell and rest upon a layer of dome switches which in turn rest upon a membrane switch layer. A backer board is placed below the membrane switch, forming a bottom to the upper housing; the backer board preferably forms a seal with the inner surface of the upper housing shell to protect the membrane switch layer and dome switches from contaminants. The upper housing and the lower housing shell are connected together by a hinging means of one or more hinge elements, which are attached to or molded in the upper housing shell or the backer board of the upper housing, and attached to or molded in the lower housing shell when they were produced; the frontward ends of the upper housing shell and lower housing shell are therefore able to open and close from one another in a clam shell fashion. The lower housing shell is formed with a number of partitions which serve to form separate compartments; the partitions further serve as support for the backer board when the integral keyboard and storage organizer is in a closed position for keyboard use. The integral keyboard and storage organizer also preferably incorporates a counterbalance means, such as a resilient spring, to offset the weight of the upper housing shell and keyboard switching mechanism, and to maintain the integral keyboard and storage organizer in the open position when the storage organizer within the lower housing shell is being accessed. The integral keyboard and storage organizer may also incorporate a locking means to maintain the integral keyboard and storage organizer in the closed position, and detent stop means to limit the angular travel of the upper housing shell in the open position.

As an alternate configuration of the above preferred embodiment, the upper housing and the lower housing shell would have the hinge elements of the hinging means located so that their rearward ends, rather than their frontward ends, are able to open and close in relation to one another.

In an alternate embodiment of the integral keyboard and storage organizer of the present invention, an upper housing shell and a lower housing shell are provided. The keyboard switching mechanism is disposed within the upper housing shell which is typically comprised of the plastic keys which protrude through the upper housing shell and rest upon a layer of dome switches which in turn rest upon a membrane switch layer. A backer board is placed below the membrane switch, forming a bottom to the upper housing; the backer board preferably forms a seal with the inner surface of the upper housing shell to protect the membrane switch layer and dome switches from contaminants. The upper housing and lower housing shell are connected together by a sliding means, where the upper housing is formed with or has slide elements attached on its lower left and right sides, such as channels, and the lower housing shell is also formed with or has complementary slide elements attached on its upper left and right sides, which interconnect with the channels of the upper housing. The upper housing is therefore able to be slid in relation to the lower housing shell and thereby expose the storage organizer compartment within the lower housing shell. The lower housing shell is formed with a number of partitions which serve to form separate compartments; the partitions may also further serve as support for the backer board when the integrated keyboard and storage organizer is in a closed position for keyboard use. The slide mechanism of the integral keyboard and storage organizer also preferably incorporates one or more detent stops to prevent the upper housing from inadvertently becoming completely detached from the lower housing shell. The detent stops may be positioned in configurations such that the upper housing may be slid forward, rearward, or both in relation to the lower housing shell.

Within the embodiments described above, it must be recognized that the height of the upper housing shell and lower housing shell may be increased, to increase the depth and volume of the storage organizer, without increasing the footprint size occupied by the integral keyboard and storage organizer.

It can be observed from the embodiments of the invention described above, that a integral keyboard and storage organizer can be manufactured with virtually no additional cost and a limited number of additional component parts to that of a typical keyboard, while providing a storage organizer that keeps necessary supplies readily at hand yet occupies no addition desktop space.

Other objects, advantages and novel features of the present invention will become apparent from the following drawings and detailed description of the preferred embodiments.

DETAILED DESCRIPTION OF THE PREFERRED EMBODIMENTS

A first embodiment of the present invention will now be described with reference to FIG. 1.

Figure 1:
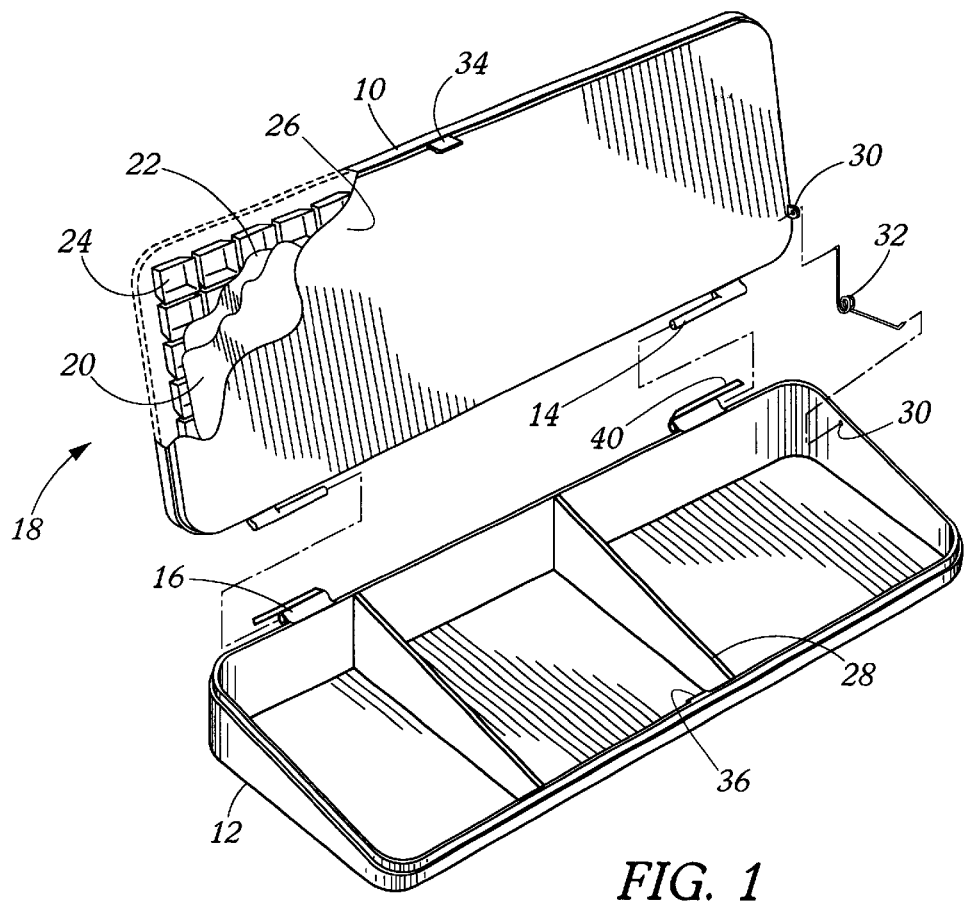
FIG. 1 is a partial sectional exploded perspective view of the first embodiment of the integral keyboard and storage organizer of the present invention.

The integral keyboard and storage organizer shown in FIG. 1 comprises an upper housing shell 10, and a lower housing shell 12. The upper housing shell 10 is formed with hinge element pins 14 at its lower rearward end; and the lower housing shell 12 is formed with hinge element pin receptacles 16 at its upper rearward end. In assembled fashion hinge element pins 14 are received within hinge element pin receptacles 16, thereby allowing the upper housing shell 10 to open and close in a clam shell fashion in relation to lower housing shell 12. Disposed within the upper housing shell 10 is a keyboard switching mechanism 18, typically comprised of a membrane switch layer 20, above which is a dome switch layer 22 upon which are placed keys 24. A backer board 26 is located below the membrane switch layer and preferably is in sealing contact with the inner surface of upper housing shell 10. Within the lower housing shell 12, a number of partitions 28 may be formed or placed, forming a number of separate compartments. Formed within the upper housing shell 10 and lower housing shell 12 are counterbalance apertures 30 within which are received the ends of a coiled spring 32 to provide a counterbalance mechanism. Upon the lower frontward end of upper housing shell 10 a locking tab 34 is located which releasably engages a locking grove 36 located at the frontward end of lower housing shell 12. Formed upon hinge element pin receptacles 16 are detent stop protrusions 40 to limit the angular travel of the upper housing shell 10 in the open position.

Figure 2:
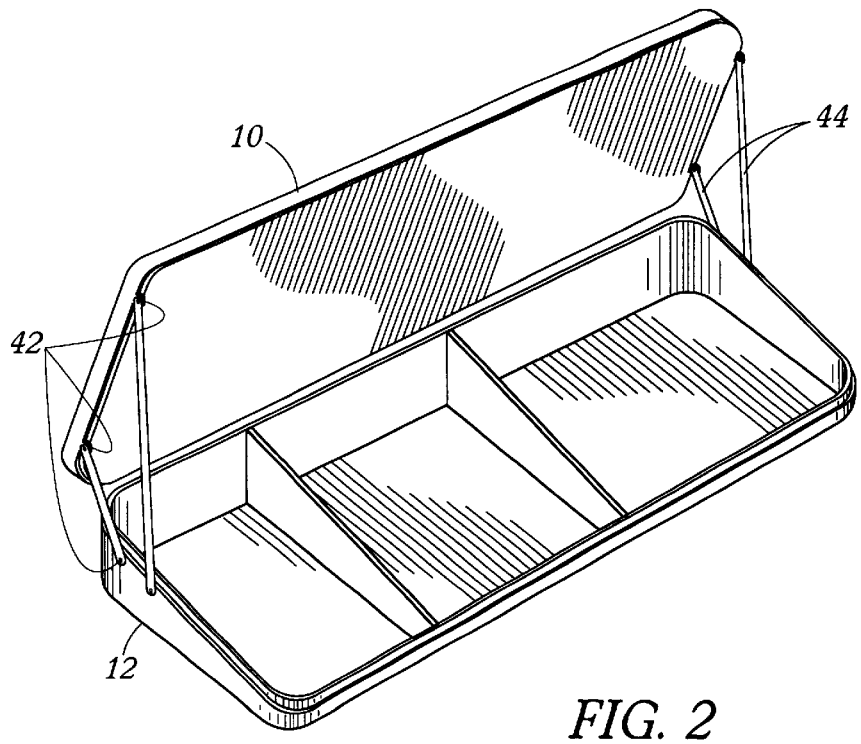
FIG. 2 is a partial perspective view illustrating an alternate form of hinge mechanism employed in the first embodiment of the integral keyboard and storage organizer.

An alternate form of hinge mechanism that may be employed in the first embodiment of the integral keyboard and storage organizer will now be described with reference to FIG. 2.

In place of the hinge element pins 14 and hinge element pin receptacles 16, described in the first embodiment above, this alternate form of hinge mechanism illustrates that a compound hinge mechanism may be employed that causes the upper housing shell 10 and the lower housing shell 12 to separate from each other at their hinged axis end as their angular relation is increased, which may be desirable where interference would otherwise be encountered at the hinged axis, such as where the hinged axis end of the integral keyboard and storage organizer is not straight. Upper housing shell 10 is formed with a pair of hinge lugs 42 on both the lower right and lower left sides. Likewise lower housing shell 12 is formed with a pair of hinge lugs 42 on both the right side and left side. Two pair of hinge rods 44 with an aperture at each end of each rod are provided. Each hinge rod 44 is pivotally assembled at each end to the appropriate hinge lug 42 of the upper housing shell 10 and lower housing shell 12. As the two hinge rods 44 on each side of the integral keyboard and storage organizer are different lengths and the spacing between the hinge lugs 42 of the upper housing shell 10 is greater than the spacing between the hinge lugs 42 of the lower housing shell 12, the rearward end of upper housing shell 10 is seperated from the rearward end of lower housing shell 12 as the forward ends of upper housing shell 10 and lower housing shell 12 are angularly separated. In this alternate form of a hinge mechanism, the rearward most hinge rods 44, serve as detent stops when contact is made with the upper rearward end of lower housing shell 12 and thereby limit the angular travel of the upper housing shell 10 in the open position.

A second embodiment of the present invention will now be described with reference to FIG. 3.

Figure 3:
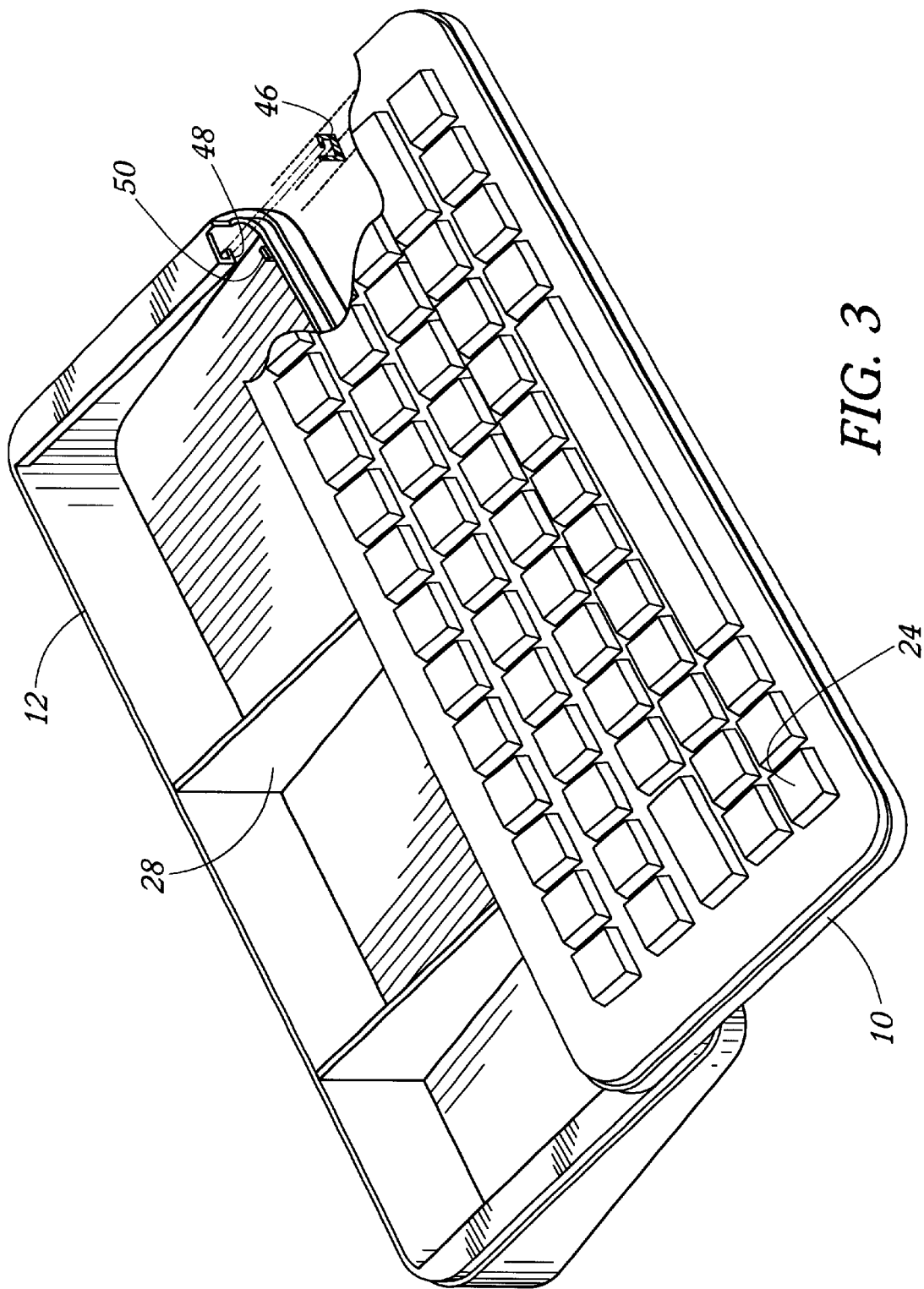
FIG. 3 is a partial sectional perspective view of a second embodiment of the integral keyboard and storage organizer of the present invention.

The integral keyboard and storage organizer shown in FIG. 3 comprises an upper housing shell 10, and a lower housing shell 12. The upper housing shell 10 is formed with first sliding track elements 46 at both its lower left and lower right ends; lower housing 12 is formed with second sliding track elements 48 at its upper left and upper right ends. In assembled fashion, first sliding track elements 46 slideably engage second sliding track elements 48, attaching the upper housing shell 10 to the lower housing shell 12 and allowing the upper housing shell 10 to slide in relation to the lower housing shell 12, exposing the interior of lower housing shell 12. Disposed within the upper housing shell 10 is a keyboard switching mechanism. Within the lower housing shell 12, a number of partitions 28 may be formed or placed forming a number of separate compartments. Adjacent to each pair of first sliding track element 46 and second sliding track element 48, are slide stop protrusions 50 which contact each other at the fully open position and prevent the upper housing shell 10 from being completely separated from lower housing shell 12.

Although the detailed description of the drawings is directed toward illustrating the above described embodiments, it will be apparent, to one of ordinary skill in the art, that various known hinging means, compound hinging mechanisms, slideing means, counterbalance means, locking means, detent stop means, keyboard switching mechanisms and keyboard key arrangements, could be substituted for those depicted in the preferred embodiments described herein. The present invention is not limited to such preferred embodiments, as variations and modifications may be made without departing from the scope of the present invention as claimed herein.

What is claimed is:

1. An integral keyboard and storage organizer comprising:
   an upper housing, said upper housing containing and partially enclosing a keyboard switching mechanism;
   said keyboard switching mechanism adapted to communicate with a computer;
   a bottom surface of said upper housing defining the upper periphery of a storage compartment;
   a lower housing shell, an inner surface of said lower housing shell defining the lower periphery of said storage compartment;
   said storage compartment being physically and electrically isolated from said computer; and
   hinging means, for hingably connecting said upper housing to said lower housing shell in a clam shell fashion, whereby upon application of an external force the angular separation between said upper housing and said lower housing shell may be selectably increased and decreased, thereby exposing and concealing said storage compartment.

2. An integral keyboard and storage organizer according to claim 1, further comprising detent stop means to limit the possible angular separation of said upper housing from said lower housing shell.

3. An integral keyboard and storage organizer according to claim 2, further comprising counterbalance means to hold said upper housing and said lower housing shell at a position of angular separation upon removal of an external force.

4. An integral keyboard and storage organizer according to claim 3, further comprising locking means to maintain the upper housing and lower housing shell in a position of minimal angular separation, at which position the storage compartment is not exposed.

5. An integral keyboard and storage organizer according to claim 1, further comprising at least one partition disposed within said storage compartment.

6. An integral keyboard and storage organizer according to claim 4, further comprising at least one partition disposed within said storage compartment.

7. An integral keyboard and storage organizer according to claim 1, wherein said hinging means comprises a compound hinge mechanism, whereby the upper housing and the lower housing shell separate from each other at their hinged axis end as their angular separation is increased, and close toward each other at their hinged axis end as their angular separation is decreased.

8. An integral keyboard and storage organizer according to claim 7, further comprising detent stop means to limit the possible angular separation of said upper housing from said lower housing shell.

9. An integral keyboard and storage organizer according to claim 8, further comprising counterbalance means to hold said upper housing and said lower housing shell at a position of angular separation upon removal of an external force.

10. An integral keyboard and storage organizer according to claim 9, further comprising locking means to maintain the upper housing and lower housing shell in a position of minimal angular separation, at which position the storage compartment is not exposed.

11. An integral keyboard and storage organizer according to claim 7, further comprising at least one partition disposed within said storage compartment.

12. An integral keyboard and storage organizer according to claim 10, further comprising at least one partition disposed within said storage compartment.

13. An integral keyboard and storage organizer comprising:
   an upper housing, said upper housing containing and partially enclosing a keyboard switching mechanism;
   said keyboard switching mechanism adapted to communicate with a computer;
   a bottom surface of said upper housing defining the upper periphery of a storage compartment;
   a lower housing shell, an inner surface of said lower housing shell defining the lower periphery of said storage compartment;
   said storage compartment being physically and electrically isolated from said computer; and
   sliding means, for slideably connecting said upper housing to said lower housing shell, whereby upon application of an external force said upper housing may be slid in parallel alignment to said lower housing shell to selectably expose and conceal said storage compartment.

14. An integral keyboard and storage organizer according to claim 13, further comprising detent stop means to limit the length of travel of the slideing means and prevent separation of said upper housing from said lower housing shell.

15. An integral keyboard and storage organizer according to claim 13, further comprising at least one partition disposed within said storage compartment.

16. An integral keyboard and storage organizer according to claim 14, further comprising at least one partition disposed within said storage compartment.

* * * * *